(12) United States Patent
Kiezebrink

(10) Patent No.: US 10,874,110 B2
(45) Date of Patent: Dec. 29, 2020

(54) METHOD OF PERFORMING A PROCEDURE ON AN ANIMAL INVOLVING STUNNING AND/OR KILLING SAID ANIMAL

(71) Applicant: Harm Kiezebrink, Celle (DE)

(72) Inventor: Harm Kiezebrink, Celle (DE)

(*) Notice: Subject to any disclaimer, the term of this patent is extended or adjusted under 35 U.S.C. 154(b) by 27 days.

(21) Appl. No.: 16/467,217

(22) PCT Filed: Dec. 7, 2017

(86) PCT No.: PCT/NL2017/050823
§ 371 (c)(1),
(2) Date: Jun. 6, 2019

(87) PCT Pub. No.: WO2018/106115
PCT Pub. Date: Jun. 14, 2018

(65) Prior Publication Data
US 2020/0268000 A1 Aug. 27, 2020

(30) Foreign Application Priority Data
Dec. 7, 2016 (NL) .................................. 2017948

(51) Int. Cl.
*A22B 3/00* (2006.01)
(52) U.S. Cl.
CPC .................. *A22B 3/005* (2013.01)
(58) Field of Classification Search
CPC .. A22B 3/00; A22B 3/005; A22B 5/00; A22B 7/00
USPC ....................... 452/52, 57, 66, 173
See application file for complete search history.

(56) References Cited

U.S. PATENT DOCUMENTS

| 7,435,166 B2* | 10/2008 | Benson | A01N 25/16 |
| | | | 452/173 |
| 9,131,704 B2* | 9/2015 | Wigfall | A22B 3/005 |
| 2007/0249273 A1* | 10/2007 | Francis | A22B 7/008 |
| | | | 452/66 |
| 2009/0203302 A1* | 8/2009 | Kiezebrink | A22B 3/086 |
| | | | 452/66 |

FOREIGN PATENT DOCUMENTS

DE   102015016834 A1   6/2017

OTHER PUBLICATIONS

Kiezebrink, Harm, The Anoxia Method—Applying the Anoxia Method for Euthanizing Poultry, https://www.slideshare.net/charmkey5/applying-the-anoxia-method-for-small-culling-poultry-flocks, Mar. 12, 2015.

(Continued)

*Primary Examiner* — Richard T Price, Jr.
(74) *Attorney, Agent, or Firm* — Jeffrey D. Shewchuk; Shewchuk IP Services, LLC

(57) ABSTRACT

A method of performing a procedure on an animal involving i) gas-based stunning, and/or ii) gas-based killing, using a foam. The foam contains a gas having a gas composition suitable for performing the procedure, such as pure nitrogen. The procedure is performed using a container (100) and the method comprises the steps of
introducing the foam in the container (100) and
performing the procedure.
To reduce any problem caused by the susceptibility of foam to break up, the animal is introduced in the container (100) and subsequently the foam is used to expel at least 90% of the air in the container (100) from the container (100).

19 Claims, 3 Drawing Sheets

(56) References Cited

OTHER PUBLICATIONS

D. E. F. Mckeegan et al, "Physiological and Behavioral Responses of Poultry Exposed to Gas-Filled High Expansion Foam", Poultry Science, vol. 92, No. 5, May 1, 2013 (May 1, 2013), p. 1145-1154.
Screenprints from www.anoxia.eu.

* cited by examiner

METHOD OF PERFORMING A PROCEDURE ON AN ANIMAL INVOLVING STUNNING AND/OR KILLING SAID ANIMAL

The present invention relates to a method of performing a procedure on an animal, said procedure being chosen from
  i) gas-based stunning, and
  ii) gas-based killing, using a foam, said foam having a gas composition suitable for performing the procedure;
wherein the procedure is performed using a container; and wherein the method comprises the steps of
  introducing the foam in the container and
  performing the procedure;
is performed.

A method according to the preamble is known in the art, for example from WO2007021178, which relates to the sanitary slaughter of animals, something that may be necessary to contain the spread of highly pathogenic diseases. This publication discloses a container with a lid having a hole allowing the passage of animals such as poultry. The container is provided with foam and chicken are introduced into the container and into the foam.

A problem with this method is that the foam breaks up. This happens in particular when the animal gets unconscious, and involuntary muscle contractions occur.

The object of the present invention is to provide a method that is less susceptible to this problem.

To this end, a method according to the preamble is characterized in that the animal is introduced in the container and subsequently the foam is used to expel at least 90% of the air in the container from the container.

With the present invention, it no longer is a problem that the foam breaks up. The present invention thus also allows for the use of foam with relatively large bubbles, which is less uncomfortable for the animals. In general the container will have an outlet opening in the top half of the container, more preferably in the roof or at the junction between the walls and the roof. Preferably at least 94% and more preferably at least 97% and most preferably at least 99% of all air in the container is expelled by the introducing of the foam. Most preferably foam is introduced until it leaves the outlet opening.

Gas-based stunning is any method of rendering an animal unconscious using gas, examples of which are disclosed in COUNCIL REGULATION (EC) No 1099/2009 which details several methods within the scope of that term. For convenience only, in the present application the term anaesthesia and its verb are used interchangeably with gas-based stunning.

The method according to the present invention may be used for stunning and/or killing various animals, such as poultry (chicken, turkeys etc.) and mammals, such as pigs.

Animals may be stunned and/or killed for the purpose of slaughter for consumption. If they are only stunned using the method according to the invention, they will be killed while stunned using other techniques, such as by bleeding or electrocution. It is also possible to render animals unconscious using a different technique and slaughter them with the method according to the present invention. The method according to the present invention can also be used for both anaesthetising and killing (e.g. for culling, slaughter etc.) the animal.

To prevent unnecessary pain, distress or suffering during stunning, culling, killing, slaughter and related operations, the animals may be restrained using for example a straight-jacket, held between bars or walls, or in a hammock, to ensure optimal conditions for the welfare of the animals.

According to a favourable embodiment, after expelling the air, the supply of foam is halted.

This saves on the amount of foam necessary for performing the method. It also saves on the gas used for the foam.

According to a favourable embodiment, the container comprises an outlet opening for air, and once the air is expelled the outlet opening is blocked.

Thus no ambient oxygen can enter the container, making any breaking up of the foam not only even less of a problem but even advantageous if the nose of the animal is then above the foam/and or the bubble size increase that is a result of breaking up increases to a size that is less uncomfortable for the animal.

According to a favourable embodiment, the outlet opening is provided with a conduit.

Thus air is expelled by the foam from the lumen of the container via the conduit. Typically, foam will end up in the conduit. The conduit helps to make entry of atmospheric air (and hence oxygen) into the container harder. This is in particular true because the movement of the animal in the container may cause the flow of air and/or foam, which could facilitate the entry of air into the container.

According to a favourable embodiment, the conduit comprises a siphon and air is expelled from the container with foam entering the siphon.

Foam in the siphon acts to block the outlet opening as it will remain in place in the siphon, even when foam in the container is broken up. If air is expelled until foam leaves the siphon, then one has a visual clue that the foam supply may be stopped. Also, it is not necessary to use a container with a valve or other means (such as a lid) to block the outlet opening. This simplifies the work to be done.

According to a favourable embodiment, the foam contains less than 2% by vol. oxygen, preferably less than 1% by vol. and more preferably less than 0.5% by vol.

This helps to perform the procedure quickly, avoiding distress and panic reactions. In particular with anoxic oxygen concentrations (less than 1% oxygen by volume), these reactions may be reduced, which in turn may reduce muscle spasms that could lead to injuries.

According to a favourable embodiment, the foam contains gas with a carbon dioxide concentration of less than 2% by vol.

This helps to reduce muscle spasms.

According to an especially preferred embodiment, the foam is supplied from bottom of the container towards the top of the container.

By providing the foam at the bottom, the foam gets pushed up by newly introduced foam (the animal will be covered with foam from below, which causes less stress). This reduces the risk of pockets of air remaining. It also reduces the discomfort for the animal; and reduces the desire to flee towards a particular part of the container. The nozzle from which the foam emanates is preferably facing the floor of the container, which also helps to ensure that air is expelled from the container to the desired extent.

According to a favourable embodiment, the foam contains at least 98% by volume of nitrogen.

Nitrogen may be sequestered from the atmosphere, on location, obviating the need to lug around high pressure vessels or having to deal with cryogenic temperatures. An unlimited supply is available at any location, it is safe for workers and it is environmentally friendly.

According to a favourable embodiment, the air is expelled within 30 seconds after the nose of the animal is covered with foam, preferably within 20 seconds and more preferably within 10 seconds.

Thus it can be ensured that the container is filled before the animal is unconscious and breaking up of the foam is going to be a problem.

For the height of the nose, the height of the nose during a normal (non-feeding) standing position of the animal can be taken.

According to a favourable embodiment, the foam is foam having an expansion factor of at least 350, preferably at least 500, more preferably at least 750.

The expansion factor is equal to the volume of the foam divided by the amount of liquid from which the foam is formed. A high expansion factor means that the bubbles are relatively large. Such bubbles break more easily, which is a problem for the method according to the prior art, but less of a problem with the present invention, allowing the method according to the present invention to cause less discomfort to the animal.

According to a favourable embodiment, after the step of expelling at least 90% of the air in the container from the container, the foam is subjected to a step of breaking up the foam.

Thus the foam will not impede viewing of the animal, allowing it to be monitored, e.g. for animal welfare purposes. The foam may be broken up using an anti-foam agent sprayed on the foam or mechanically, such as using a rotating fan blade. Care will be taken to maintain the gas released by the foam breaking up inside the container. For example, if the container has a lid, it will remain closed.

Breaking up the foam while the container remains closed allows the animal to be observed while the gas takes its effect. Also, discomfort for the animal due to the foam is reduced to a relatively short period of filing of the container with foam to expel air and until the amount of foam is sufficiently reduced by breaking it up so as not to cover sensitive parts of the animal.

According to a favourable embodiment, the container comprises a bottom, a roof and walls extending from the bottom to the roof.

This is an important application of the invention. Such a container is in particular suitable for repeated use in the method according to the invention. It can be provided with sensors (e.g. for temperature, gas concentration etc.), a camera (for monitoring an animal in the lumen), etc. It is in particular also suitable for a method involving breaking up of the foam.

According to a favourable embodiment, the container is a bag, the animal is introduced into the bag inside a further container, and the foam is introduced inside the bag and the animal is subjected to the foam until it is unconscious after which the container is opened and the bag is closed.

The bag may be placed inside the further container with the circumferential edge section of the opening of the bag placed over the circumferential edge of the further container. The bag may be temporarily closed off with a lid until movement of the animal stops. The lid will then be removed and the bag will be closed, e.g. with tie-wrap. This allows the further container to be used for another animal, while the animal will meet its end inside the bag but outside the further container. This helps to save time.

The present invention will now be illustrated with reference to the drawing where FIG. 1A shows a schematic overview of an apparatus for performing a stunning and/or killing procedure on an animal, with a container shown in top view;

Figure 1A:
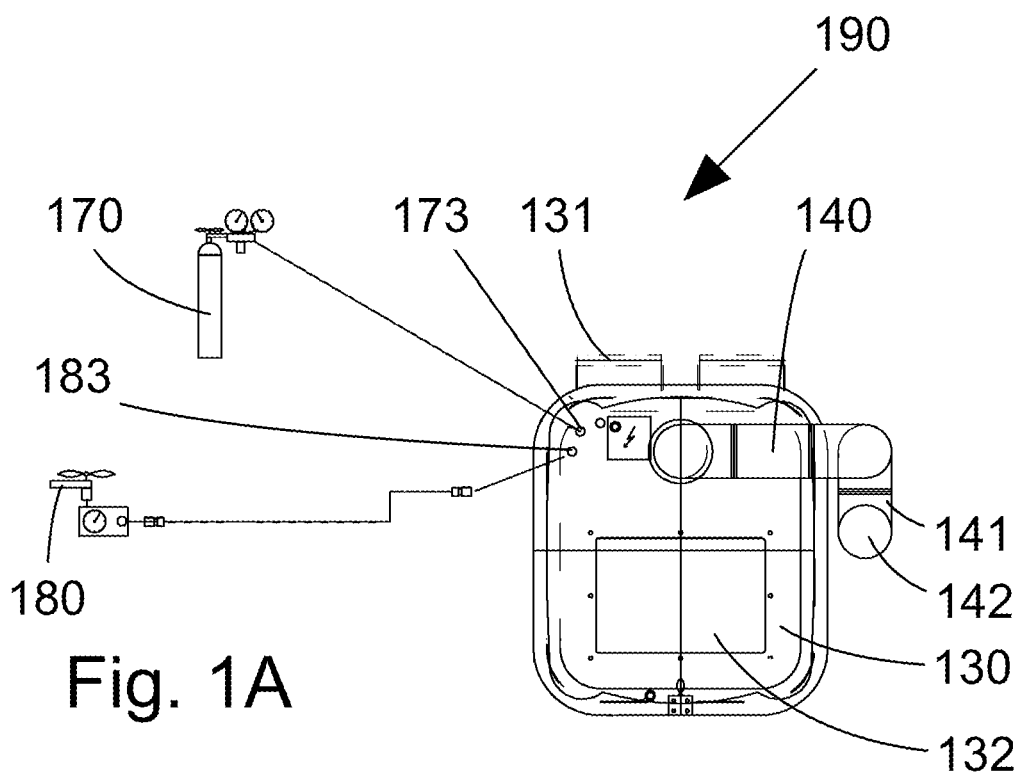
FIG. 1B shows a schematic front view of the container shown in FIG. 1A.

FIG. 1A shows a schematic overview of an apparatus 190 for performing a stunning and/or killing procedure on an animal, with a container 100 shown in top view. The apparatus comprises a source 170 of nitrogen (here a gas bottle) and a source 180 of water containing detergent in water. The nitrogen and the source 180 of water containing the detergent will be used to generate a foam.

For all practical means and purposes the container 100 is hermetically closed off from the ambient atmosphere, to the extent that the floor, walls and top will not let ambient air in or foam out in so far as this would adversely affect the procedure.

Figure 1B:
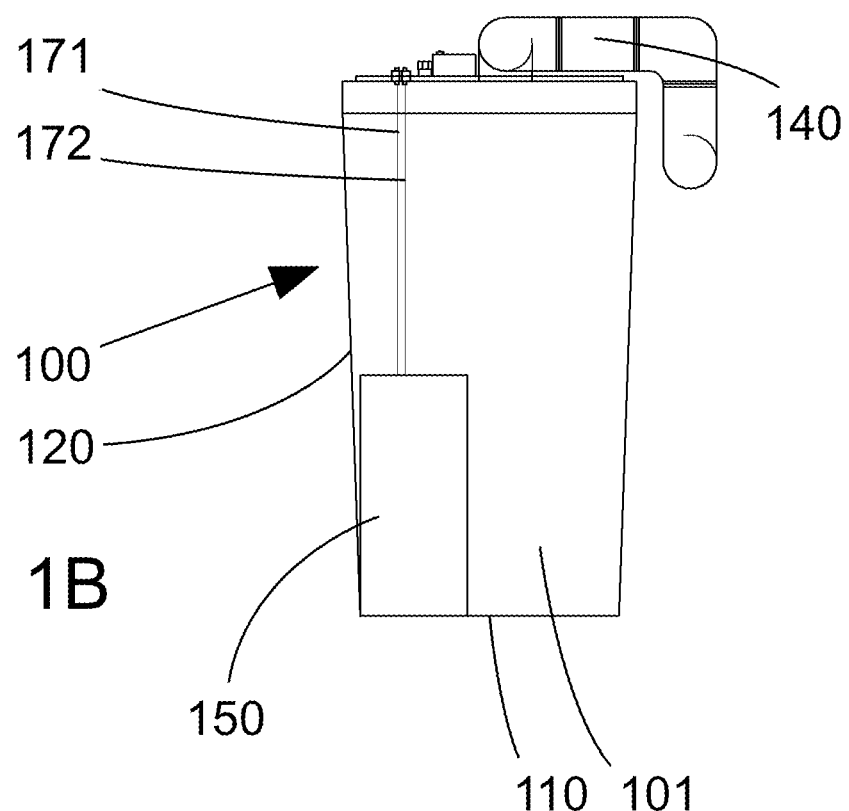

FIG. 1B shows a front view of the container 100 of FIG. 1A. The container comprises a bottom 110, upright walls 120 and a roof 130, here a lid 130 capable of pivoting about hinges 131 (FIG. 1A).

In the embodiment shown, the lid 130 comprises a window 132 of plexiglass so as to be able to monitor lumen 101 of the container 100.

The roof 130 of the container 100 is provided with a tube 140 comprising a U-shaped section 141 (siphon), said U-shaped section defining an upwards facing outlet opening 142 for foam. Once foam leaves this opening, it is ascertained even without use of the window 132 that the container 100 is filled with foam and thus an animal introduced into the container 100 is subjected to the procedure.

Inside the container 100 a foam generator 150 is provided, fed via a flexible gas hose 171 and a flexible water hose 172 for the detergent solution. The supply is controlled by magnetic valve 173 and magnetic valve 183 respectively. The foam generator 150 is discussed in more detail below.

Figure 2:
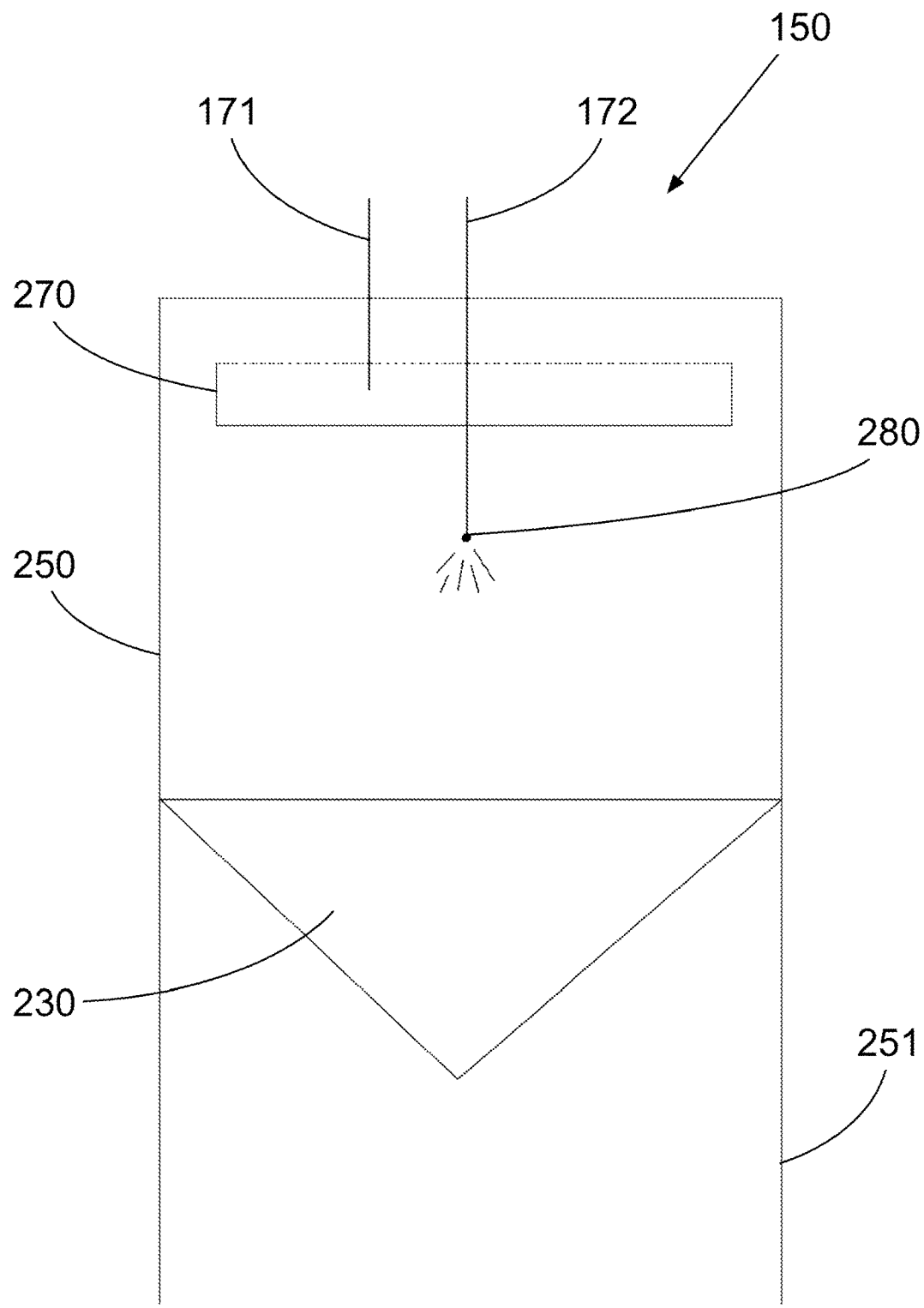
FIG. 2 shows a schematic view of a foam generator suitable for use in the container of FIG. 1B.

FIG. 2 schematically depicts the foam generator 150 suitable for use in the method according to the invention. It is capable of generating foam with a high gas to liquid ratio (also known as expansion factor), such as of 350 and more.

The foam generator 150 comprises a cylindrical housing 250 with a radius of 20 cm and is provided on four legs 251 so as to allow foam generated to flow downward and sideways freely. Because the foam generator 150 is placed on the bottom of the container 100, the foam generated will rise upwards, expelling air from the container. The air is exhausted via the tube 140.

Nitrogen is introduced via gas hose 171 into a hollow disk 270 having a perforated top, acting as a gas diffuser, from which the nitrogen flows into the lumen of the cylindrical housing 250 along the edges of the hollow disk 270 downward. The nitrogen is supplied at a pressure of 3.5 bar and with a rate of 600 liter per minute (expressed at ambient pressure).

Simultaneously water containing 3 vol. % HTF1000 (Stahmer, Hamburg, Germany) as a detergent supplied via water hose 172 is sprayed through a water nozzle 280 into the lumen and onto a conical sieve plate 230 having a plurality holes of 5 mm diameter. The water containing detergent is introduced at a rate of 1.2 liter/min at a pressure of 0.5 bar.

The above operating values were found to be suitable operating parameters for performing the procedure, filling the container 100 having a volume of 240 liter in less than half a minute with foam. The container 100 described here was for experimental purposes. For high-through-put the volume will be significantly larger, but the time for filling the container will not be significantly different, which can be achieved using a multitude of foam generators and/or foam generators of higher capacity. The walls of such a container may have one or more closable doors to introduce and/or remove the animals subjected to the procedure.

The high-expansion foam fills up the container 100, from the bottom, enclosing an animal that is placed in the container, until the foam quickly reaches the top of the container and flows through the siphon 141, connected to the top of the container 100.

The method according to the present invention can be varied within the scope of the accompanying claims in several manners. For example, it is possible to introduce air top down and expel the foam from the container to a large extent via a closable opening at or near floor level. The heart distance to the floor is preferably at most 50 cm, preferably less than 30 cm.

Figure 3:
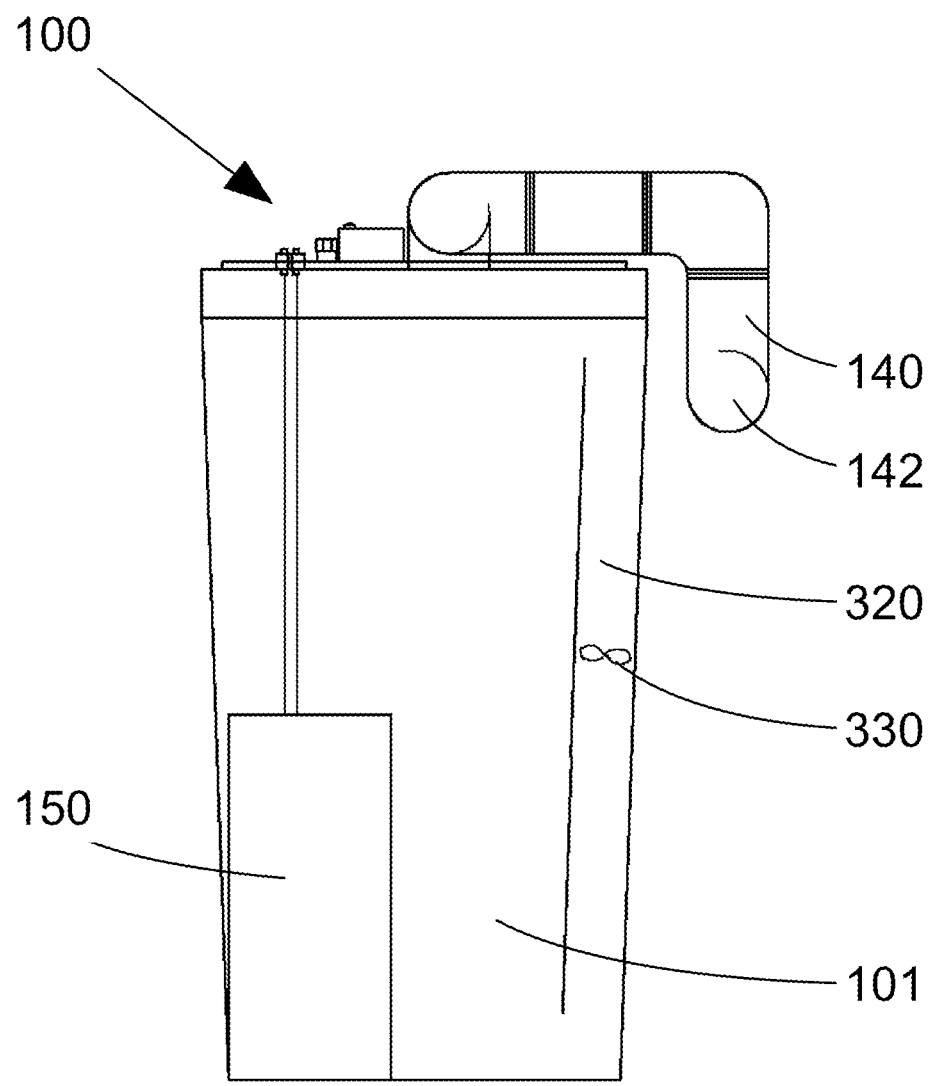
FIG. 3 shows a schematic front view corresponding to FIG. 1B of a different embodiment of the container shown in FIG. 1A.

FIG. 3 shows a schematic front view corresponding to FIG. 1B of a different embodiment of the container 100 shown in FIG. 1A. Inside the container a tube 320 is provided along a wall 120, and said tube 320 is provided with a fan 330. After expelling air from the container 100 using foam, the foam is broken down by turning on the fan 330. Foam will be sucked into the tube 320 (preferably from below) and forced down in the lumen 101 by the gas leaving the tube 320 downstream of the fan 330. Thus the animal in the lumen 101 of the container 100 will no longer need to be covered with foam while the nitrogen atmosphere is maintained. This makes the process less uncomfortable for the animal. The animal can now be monitored easily, e.g. using a camera or via a window. In principle the container may be transparent.

The invention can be varied within the scope of the appended claims. For example, the fan 330 for breaking up the foam may be provided in the lid or roof of a container 100, with a bypass providing an inlet and an outlet, both in open communication with the lumen. The fan will be provided in the bypass. Thus operating the fan will force the foam through the bypass, which foam will break up when passing the fan. Being provided in the lid, no space of the lumen is wasted. Also, this embodiment is suitable in case bags are used as a container, and the roof or lid is of the further container containing the bag.

The invention claimed is:

1. A method of performing a procedure on an animal, said procedure being chosen from
   i) gas-based stunning, and
   ii) gas-based killing,
using a foam, said foam having a gas composition suitable for performing the procedure;
wherein the procedure is performed using a container; and
wherein the method comprises the steps of
   introducing the foam in the container and
   performing the procedure;
is performed;
characterized in that the animal is introduced in the container and subsequently the foam is used to expel at least 90% of the air in the container from the container, wherein the foam is supplied from bottom of the container towards the top of the container, and the foam gets pushed up by newly introduced foam.

2. The method according to claim 1, wherein after expelling the air, the supply of foam is halted.

3. The method according to claim 1, wherein the container comprises an outlet opening for air, and once the air is expelled the outlet opening is blocked.

4. The method according to claim 1, wherein the outlet opening is provided with a conduit.

5. The method according to claim 4, wherein the conduit comprises a siphon and air is expelled from the container with foam entering the siphon.

6. The method according to claim 1, wherein the foam contains less than 2% by vol. oxygen.

7. The method according to claim 6, wherein the foam contains less than 1% by vol. oxygen.

8. The method according to claim 7, wherein the foam contains less than 0.5% by vol. oxygen.

9. The method according to claim 1, wherein the foam contains gas with a carbon dioxide concentration of less than 2% by vol.

10. The method according to claim 1, wherein the foam contains at least 98% by volume of nitrogen.

11. The method according to claim 1, wherein the air is expelled within 30 seconds after the nose of the animal is covered with foam.

12. The method according to claim 11, wherein the air is expelled within 20 seconds after the nose of the animal is covered with foam.

13. The method according to claim 12, wherein the air is expelled within 10 seconds after the nose of the animal is covered with foam.

14. The method according to claim 1, wherein the foam is foam having an expansion factor of at least 350.

15. The method according to claim 14, wherein the foam is foam having an expansion factor of at least 500.

16. The method according to claim 15, wherein the foam is foam having an expansion factor of at least 750.

17. The method according to claim 1, wherein after the step of expelling at least 90% of the air in the container from the container, the foam is subjected to a step of breaking up the foam.

18. The method according to claim 1, wherein the container comprises a bottom, a roof and walls extending from the bottom to the roof.

19. The method according to claim 1, wherein the container is a bag, the animal is introduced into the bag inside a further container and the foam is introduced inside the bag and the animal is subjected to the foam until it is unconscious after which the container is opened and the bag is closed.

* * * * *